(12) United States Patent
Yonezawa et al.

(10) Patent No.: US 12,224,632 B2
(45) Date of Patent: Feb. 11, 2025

(54) APPARATUS FOR FABRICATING LAMINATED CORE

(71) Applicant: Kabushiki Kaisha F.C.C., Hamamatsu (JP)

(72) Inventors: Michiharu Yonezawa, Hamamatsu (JP); Takashi Amano, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/436,148

(22) Filed: Feb. 8, 2024

(65) Prior Publication Data

US 2024/0283335 A1 Aug. 22, 2024

(30) Foreign Application Priority Data

Feb. 17, 2023 (JP) ................................ 2023-023208

(51) Int. Cl.
*B23P 19/00* (2006.01)
*B21D 22/02* (2006.01)
(Continued)

(52) U.S. Cl.
CPC ........... *H02K 15/024* (2013.01); *B21D 22/02* (2013.01); *B32B 37/1284* (2013.01);
(Continued)

(58) Field of Classification Search
CPC .. H02K 15/024; B21D 22/02; B32B 37/1284; B32B 38/04; B32B 41/00; B32B 2038/042; B32B 2311/30
See application file for complete search history.

(56) References Cited

U.S. PATENT DOCUMENTS 5,171,962 A * 12/1992 Sakanishi .......... B23K 26/0676
219/121.64
9,101,973 B2 * 8/2015 Ueno .................. B21D 45/003
(Continued)

FOREIGN PATENT DOCUMENTS

JP 2001321850 A 11/2001
JP 2007324455 A 12/2007
(Continued)

OTHER PUBLICATIONS

Official Communication issued in Japanese Patent Application No. 2023-023208 mailed on Aug. 8, 2023.
(Continued)

*Primary Examiner* — Paul D Kim
(74) *Attorney, Agent, or Firm* — Keating & Bennett, LLP

(57) ABSTRACT

An apparatus for fabricating a laminated core includes a lower mold including a die including a die hole, an upper mold including a punch, a stripper plate operable to restrict upward and downward movements of a metal sheet at a lowest descending position during punching out of the metal sheet by the punch, an adhesive applicator included in the lower mold and operable to apply an adhesive onto a lower surface of the metal sheet, and a controller configured or programmed to control the stripper plate and the adhesive applicator. The controller is configured or programmed to include a movement controller to control upward and downward movements of the stripper plate, and an applicator controller to cause the adhesive applicator to apply the adhesive onto the lower surface of the metal sheet while the stripper plate is not located at the lowest descending position.

11 Claims, 13 Drawing Sheets

(51) Int. Cl.
*B32B 37/12* (2006.01)
*B32B 38/04* (2006.01)
*B32B 41/00* (2006.01)
*H02K 15/02* (2006.01)
*H05K 13/04* (2006.01)

(52) U.S. Cl.
CPC .............. *B32B 38/04* (2013.01); *B32B 41/00* (2013.01); *B32B 2038/042* (2013.01); *B32B 2311/30* (2013.01)

(56) References Cited

U.S. PATENT DOCUMENTS

| | | | |
|---|---|---|---|
| 11,271,458 B2 * | 3/2022 | Jung | ........................ H01F 41/02 |
| 2017/0297078 A1 * | 10/2017 | Nishinaka | ............. B05C 5/0212 |
| 2019/0259531 A1 | 8/2019 | Okudaria et al. | |

FOREIGN PATENT DOCUMENTS

| | | |
|---|---|---|
| JP | 2013034294 A | 2/2013 |
| JP | 6675601 B1 | 4/2020 |
| JP | 6843887 B2 | 3/2021 |
| JP | 2021093908 A | 6/2021 |
| JP | 2021168579 A | 10/2021 |
| JP | 7130894 B1 | 9/2022 |
| WO | 2016/071943 A1 | 5/2016 |
| WO | 2019/167803 A1 | 9/2019 |

OTHER PUBLICATIONS

Official Communication issued in Japanese Patent Application No. 2023-023208, mailed on Apr. 4, 2023.

Notice of Opposition (Opposition No. 2024-700199) against Japanese Patent Application No. 2023-023208 (U.S. Pat. No. 7,338,086) mailed on May 9, 2024.

* cited by examiner

APPARATUS FOR FABRICATING LAMINATED CORE

CROSS-REFERENCE TO RELATED APPLICATIONS

This application claims the benefit of priority to Japanese Patent Application No. 2023-23208 filed on Feb. 17, 2023. The entire contents of this application are hereby incorporated herein by reference.

BACKGROUND OF THE INVENTION

1. Field of the Invention

The present disclosure relates to an apparatus and a method for fabricating a laminated core.

2. Description of the Related Art

A laminated core for use in a motor or other devices is obtained in such a manner that a strip metal sheet (e.g., strip steel sheet) is punched into a predetermined shape to obtain iron core elements (cores) and the iron core elements are laminated and integrated. For example, a laminated core is obtained by laminating and integrating iron core elements with a technique such as caulking, welding, or bonding. Japanese Patent No. 6843887, for example, discloses an apparatus for fabricating a laminated core in which a plurality of iron core elements are laminated and bonded to each other with an adhesive. In Japanese Patent No. 6843887, an adhesive applicator is provided on a lower holder including a die, and in pushing a strip metal sheet against the upper surface of the die with a stripper plate, an adhesive discharged from discharge holes of the adhesive applicator is transferred onto the strip metal sheet.

In the apparatus of Japanese Patent No. 6843887, however, since the adhesive is transferred onto the strip metal sheet by bringing the strip metal sheet into contact with the adhesive discharged from the discharge holes and bulging, the distance between the strip metal sheet and the discharge holes has to be strictly managed in moving the stripper plate downward. In addition, since the strip metal sheet is brought into contact with the adhesive, the distance between the discharge holes and the strip metal sheet is very narrow, and therefore, it is difficult to apply the adhesive to a wide range of the strip metal sheet. This might reduce adhesion between the iron core elements to degrade rigidity of the laminated core.

SUMMARY OF THE INVENTION

Example embodiments of the present invention provide apparatuses and methods for fabricating laminated cores with high rigidity.

An apparatus for fabricating a laminated core according to an example embodiment of the present disclosure is an apparatus for fabricating a laminated core in which a plurality of iron core elements are laminated and bonded to each other, and includes a lower mold including a die including a die hole, an upper mold including a punch corresponding to the die hole, a stripper plate included in the upper mold and movable downward to a lowest descending position that is a lowermost position, the stripper plate being operable to restrict upward and downward movements of a metal sheet during punching out of the metal sheet by the punch, an adhesive applicator included in the lower mold and operable to apply an adhesive onto a lower surface of the metal sheet, and a controller configured or programmed to control the stripper plate and the adhesive applicator. The controller is configured or programmed to include a movement controller configured or programmed to control upward and downward movements of the stripper plate, and an application controller configured or programmed to cause the adhesive applicator to apply the adhesive onto the lower surface of the metal sheet while the stripper plate is not located at the lowest descending position.

In the apparatus for fabricating the laminated core according to one example embodiment of the present disclosure, while the stripper plate is not located at the lowest descending position, the application controller of the controller is configured or programmed to cause the adhesive applicator to apply the adhesive onto the lower surface of the metal sheet. In this example embodiment, in applying the adhesive from the adhesive applicator onto the lower surface of the metal sheet, since the stripper plate is not located lowest descending position, the distance between the metal sheet and the adhesive applicator is wide. Thus, the adhesive applied from the adhesive applicator adheres to a wide range of the lower surface of the metal sheet. Accordingly, the laminated iron core elements are securely bonded to each other so that the laminated core with high rigidity can be thereby fabricated.

A method for fabricating a laminated core according to one example embodiment of the present disclosure is a method for fabricating a laminated core in which a plurality of iron core elements are laminated and bonded to each other in a fabrication apparatus, the fabrication apparatus including a lower mold including a die including a die hole, an upper mold including a punch corresponding to the die hole, a stripper plate included in the upper mold and movable downward to a lowest descending position that is a lowermost position, the stripper plate being operable to restrict upward and downward movements of a metal sheet during punching out of the metal sheet by the punch, and an adhesive applicator operable to apply an adhesive onto a lower surface of the metal sheet, and the method includes an adhesive applying step of causing the adhesive applicator located below the metal sheet to apply the adhesive onto the lower surface of the metal sheet while the stripper plate is not located at the lowest descending position, a descending step of moving the stripper plate to the lowest descending position, and a punching step of punching the metal sheet by the punch and defining an outer shape of the iron core element while the stripper plate is located at the lowest descending position.

In the method for fabricating a laminated core according to one example embodiment of the present disclosure, in the adhesive applying step, while the stripper plate is not located at the lowest descending position, the adhesive applicator applies the adhesive onto the lower surface of the metal sheet. In this example embodiment, in applying the adhesive onto the lower surface of the metal sheet, since the stripper plate is not located at the lowest descending position, the distance between the metal sheet and the adhesive applicator is wide. Thus, the adhesive applied from the adhesive applicator adheres to a wide range of the lower surface of the metal sheet. Accordingly, the laminated iron core elements are securely bonded to each other so that the laminated core with high rigidity can be thereby fabricated.

Example embodiments of the present disclosure provide apparatuses and methods for fabricating laminated cores with high rigidity.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
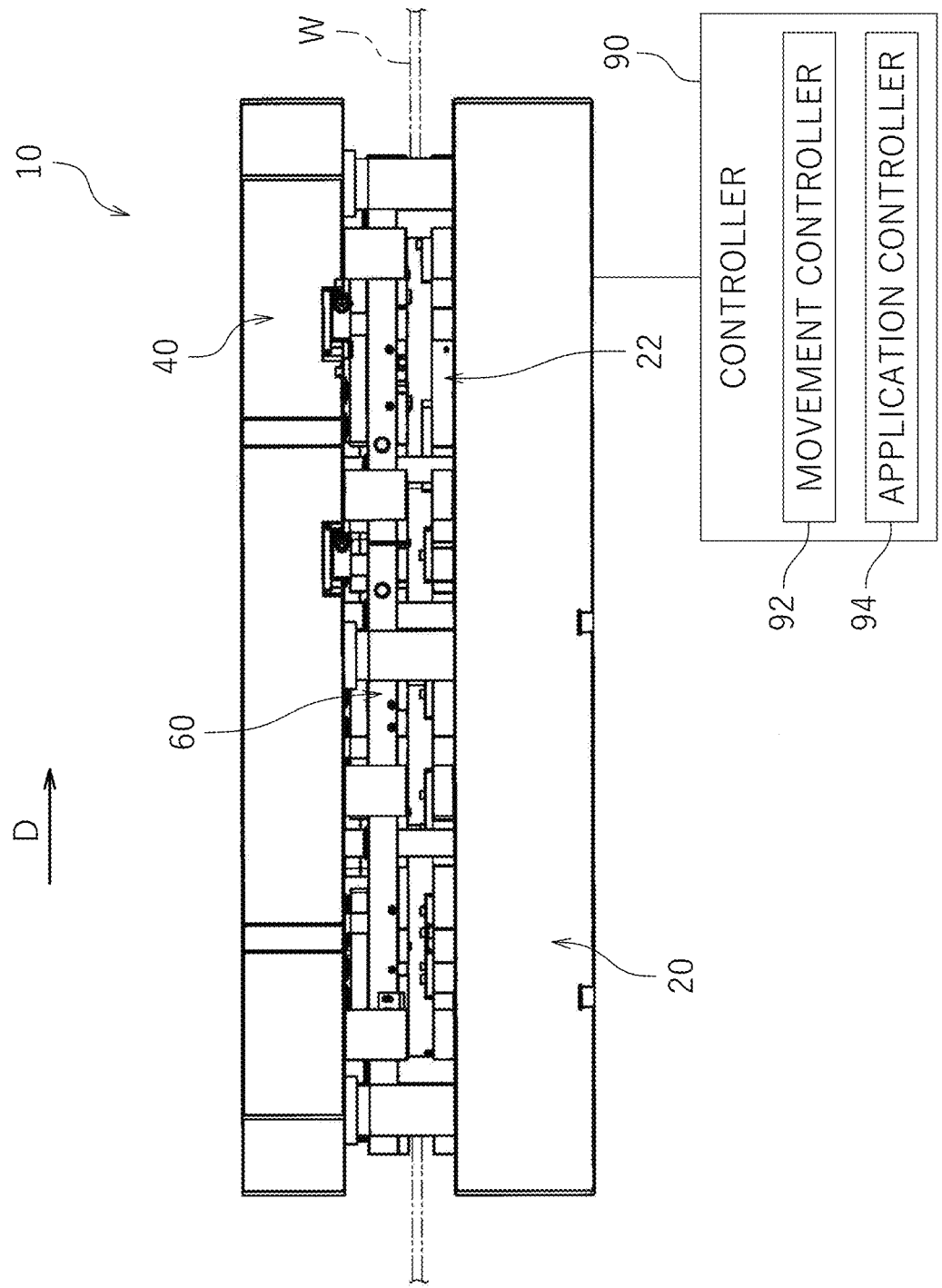
FIG. 1 is a side view illustrating an apparatus for fabricating a laminated core according to one example embodiment of the present invention.

Example embodiments of apparatuses and methods for fabricating laminated cores according to the present disclosure will be described hereinafter with reference to the drawings. The example embodiments described herein are, of course, not intended to particularly limit the present invention. Elements and features having the same functions are denoted by the same reference characters, and description for the same elements and features will not be repeated or will be simplified as appropriate.

Figure 2:
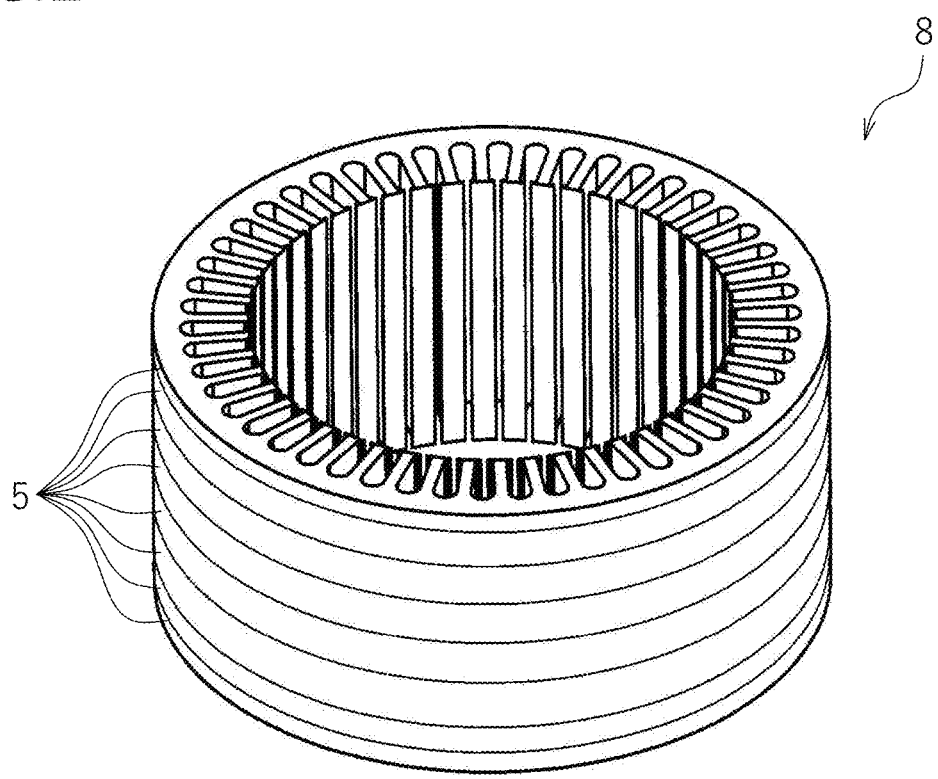
FIG. 2 is a perspective view illustrating a laminated core according to one example embodiment of the present invention.

As illustrated in FIG. 1, an apparatus 10 for fabricating a laminated core according to this example embodiment (hereinafter also referred to as a fabrication apparatus 10) fabricates a laminated core 8 in which a plurality of iron core elements 5 (see FIG. 2) are laminated and bonded to each other. The fabrication apparatus 10 is a progressive press die. In the fabrication apparatus 10, a strip metal sheet W is intermittently conveyed to a plurality of processing stages 25 (see FIG. 3) described later. The strip metal sheet W is, for example, a coil (strip thin steel sheet). The fabrication apparatus 10 includes a lower mold 20, an upper mold 40, a stripper plate 60, an adhesive applicator 70 (see FIG. 5), and a controller 90.

Figure 3:
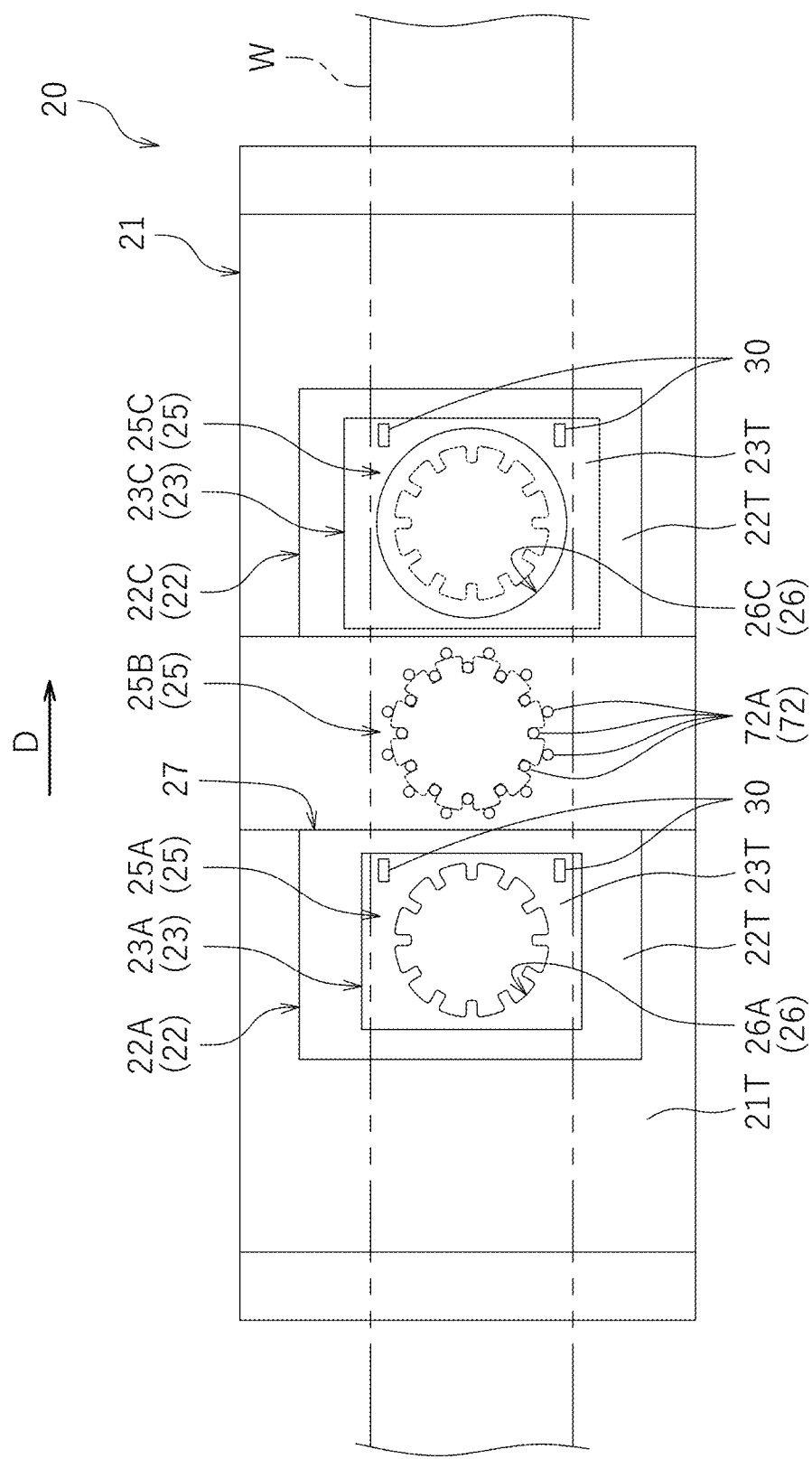
FIG. 3 is a plan view illustrating a lower mold according to one example embodiment of the present invention.

The lower mold 20 is fixed to a floor surface. As illustrated in FIG. 3, the lower mold 20 includes the plurality of processing stages 25. The processing stages 25 includes an inner shape punching stage 25A, an adhesive applying stage 25B, and an outer shape punching stage 25C. The inner shape punching stage 25A, the adhesive applying stage 25B, and the outer shape punching stage 25C are arranged in this order in a progressive direction D. The inner shape punching stage 25A includes a first die plate 22A described later, a first die 23A, an inner shape punching die hole 26A, and an inner shape punch 45A (see FIG. 5). The outer shape punching stage 25C includes a second die plate 22C described later, a second die 23C, an outer shape punching die hole 26C, and an outer shape punch 45C (see FIG. 5). The lower mold 20 includes a lower mold body 21, a die plate 22, and a die 23. The die plate 22 and the die 23 are placed on the lower mold body 21. The die plate 22 holds the die 23. The die plate 22 includes the first die plate 22A holding the first die 23A and described later, and the second die plate 22C holding the second die 23C and described later. The die 23 includes the first die 23A included in the inner shape punching stage 25A, and the second die 23C included in the outer shape punching stage 25C. The die 23 has die holes 26. The first die 23A has the inner shape punching die hole 26A serving as the die hole 26. The second die 23C has the outer shape punching die hole 26C serving as the die hole 26. An upper surface 22T of the die plate 22 and an upper surface 23T of the die 23 are located at the same or substantially the same height. More specifically, the upper surface 22T of the first die plate 22A and the upper surface 23T of the first die 23A are located at the same or substantially the same height as the upper surface 22T of the second die plate 22C and the upper surface 23T of the second die 23C. The lower mold body 21 includes the adhesive applying stage 25B. The lower mold body 21 has an adhesive application through hole 27. FIG. 3 does not show the adhesive applicator 70 (see FIG. 5).

The strip metal sheet W is intermittently conveyed to the lower mold 20 by a conveyor (not shown) located near the fabrication apparatus 10. The strip metal sheet W is intermittently conveyed to the inner shape punching stage 25A, the adhesive applying stage 25B, and the outer shape punching stage 25C in this order. The conveyor holds the strip metal sheet W in a wound state. The strip metal sheet W is conveyed to the lower mold 20 by an unillustrated unwinding device of the conveyor, and a remaining material of the pressed strip metal sheet W is conveyed from the lower mold 20 by an unillustrated winding device of the conveyor and wound by the winding device. Instead of the unwinding device and the winding device of the conveyor, the strip metal sheet W may be conveyed while being sandwiched between a pair of upper and lower rotation rolls respectively located at upstream and downstream sides of the fabrication apparatus 10.

Figure 4:
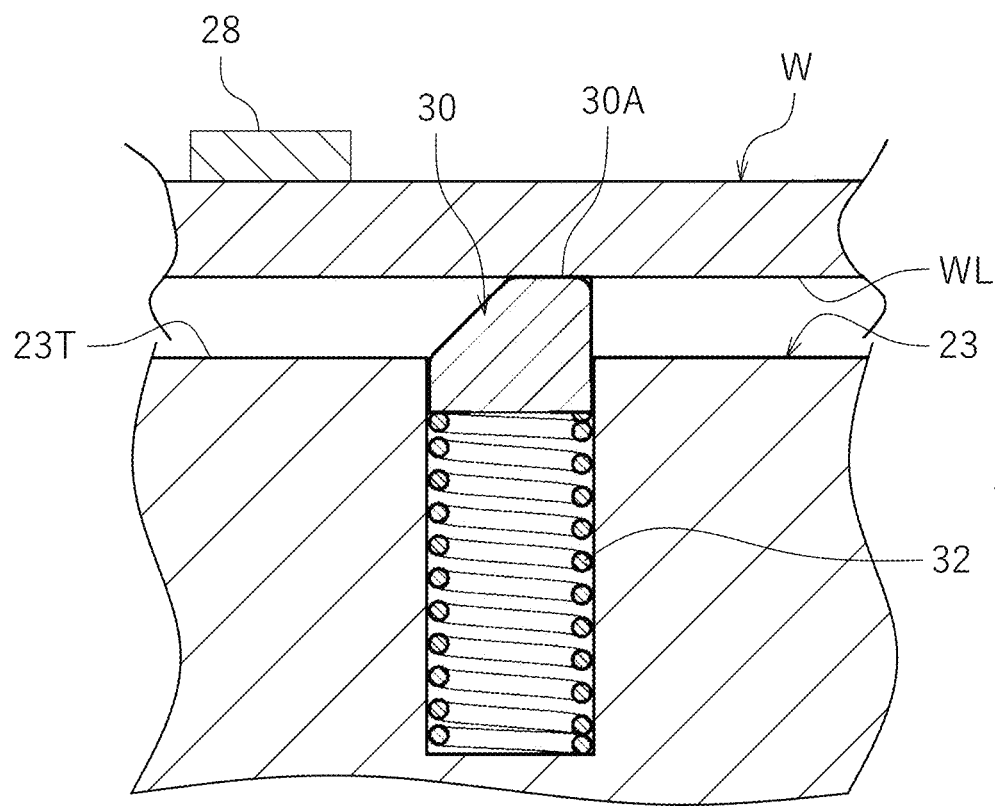
FIG. 4 is a cross-sectional view illustrating a lifter according to one example embodiment of the present invention.

As illustrated in FIG. 3, the die 23 of the lower mold 20 includes a plurality of lifters 30. The lifters 30 bias the strip metal sheet W upward. While the strip metal sheet W is intermittently conveyed above the die plate 22 and the die 23, the lifters 30 push the strip metal sheet W upward and hold the strip metal sheet W such that the strip metal sheet W is located above the upper surface 22T of the die plate 22 and the upper surface 23T of the die 23 by a predetermined distance. As illustrated in FIG. 4, the lifters 30 are biased upward by biasing members 32 located on the die plate 22. The biasing members 32 are, for example, coil springs. When the stripper plate 60 (see FIG. 1) moves downward and pushes the strip metal sheet W downward, the lifters 30 move downward against a biasing force of the biasing members 32. Accordingly, the strip metal sheet W is pushed by the stripper plate 60 against the upper surface 22T of the die plate 22 of the lower mold 20 (more specifically the upper surface 22T of the first die plate 22A and the upper surface 22T of the second die plate 22C) and the upper surface 23T of the die 23 (more specifically the upper surface 23T of the first die 23A and the upper surface 23T of the second die 23C). On the other hand, when the stripper plate 60 moves upward and a pressing force of the stripper plate 60 is not applied to the strip metal sheet W any more, the lifters 30 move upward by a biasing force of the biasing members 32. Accordingly, the lifters 30 hold the strip metal sheet W at a position above the lower mold 20 (more specifically the upper surface 22T of the die plate 22 and the upper surface 23T of the die 23) by a predetermined distance. While the strip metal sheet W is intermittently conveyed, the strip metal sheet W moves above upper surfaces 30A of the lifters 30. The lower mold 20 also includes a restriction member 28 that restricts upward movement of the strip metal sheet W when the strip metal sheet W is lifted upward by the die 23 of the lower mold 20 and the lifters 30. The restriction member 28 restricts an excessive increase of the distance between the strip metal sheet W and the lower mold 20 (more specifically the upper surface 22T of the die plate 22 and the upper surface 23T of the die 23) to a predetermined distance or more.

Figure 5:
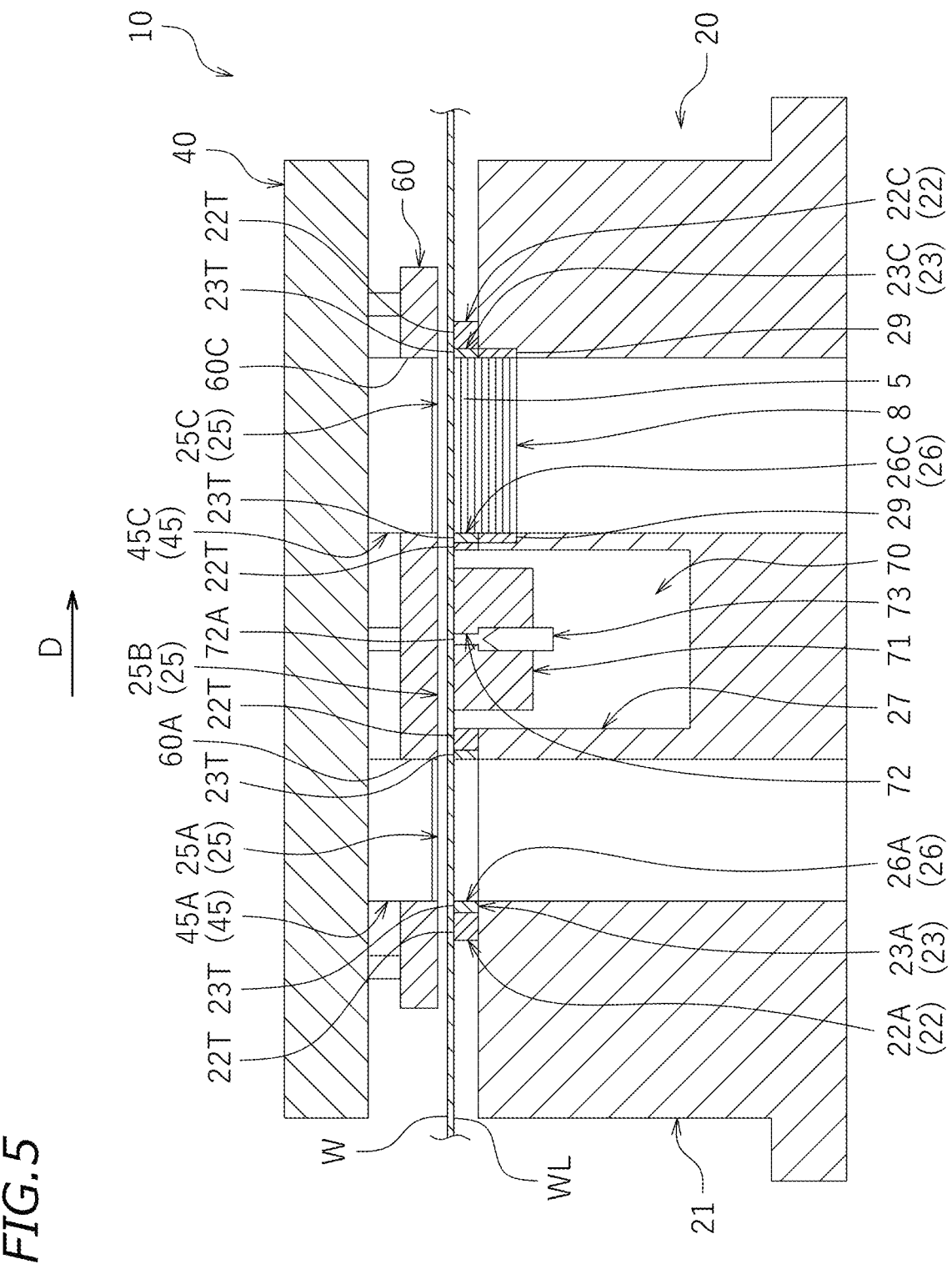
FIG. 5 is a cross-sectional view illustrating an apparatus for fabricating a laminated core according to one example embodiment of the present invention.

As illustrated in FIG. 5, the upper mold 40 is located above the lower mold 20. The upper mold 40 is movable toward and away from the lower mold 20. The upper mold 40 includes a plurality of punches 45 corresponding to the die holes 26. The punches 45 include the inner shape punch 45A and the outer shape punch 45C. The inner shape punch 45A is located above the inner shape punching die hole 26A. The inner shape punch 45A is insertable into the inner shape punching die hole 26A. The outer shape punch 45C is located above the outer shape punching die hole 26C. The outer shape punch 45C is insertable into the outer shape punching die hole 26C. In the inner shape punching stage 25A (see FIG. 3), after the upper mold 40 moves downward to approach the lower mold 20, the strip metal sheet W is punched out by the inner shape punch 45A and the inner shape punching die hole 26A. Accordingly, inner shapes of the iron core elements 5 are defined in the strip metal sheet W. In the outer shape punching stage 25C (see FIG. 3), after the upper mold 40 moves downward to approach the lower mold 20, the strip metal sheet W is punched out by the outer shape punch 45C and the outer shape punching die hole 26C. Accordingly, outer shapes of the iron core elements 5 are defined in the strip metal sheet W to complete the iron core elements 5 (see also FIG. 2), and the resulting iron core elements 5 are sequentially stacked in the outer shape punching die hole 26C. As described later, since the lower surfaces of the completed iron core elements 5 are coated with an adhesive, when the iron core elements 5 are stacked, the iron core elements 5 stacked in the top-bottom direction are thereby bonded to each other.

As illustrated in FIG. 5, the stripper plate 60 is included in the upper mold 40. The stripper plate 60 is located at a position facing the die plate 22 of the lower mold 20. The stripper plate 60 is movable upward and downward together with the upper mold 40. The stripper plate 60 is movable downward to a lowest descending position LP (see FIG. 7C) that is the lowermost position. In punching the strip metal sheet W by the punches 45, the stripper plate 60 restricts upward and downward movement of the metal sheet W at the lowest descending position LP. Even when the metal sheet W is located slightly above the lowest descending position LP, the stripper plate 60 can restrict upward and downward movements of the metal sheet W. When the stripper plate 60 moves to the lowest descending position LP, the stripper plate 60 pushes the strip metal sheet W that is being intermittently conveyed against the lower mold 20 (the die plate 22 and the die 23 in this example) such that the strip metal sheet W can be sandwiched between the stripper plate 60 and the lower mold 20 (the die plate 22 and the die 23 in this example). The stripper plate 60 pushes the strip metal sheet W against the upper surface 22T of the die plate 22 and the upper surface 23T of the die 23. The stripper plate 60 has a punch insertion hole 60A in which the inner shape punch 45A is to be inserted, and a punch insertion hole 60C in which the outer shape punch 45C is to be inserted. When the upper mold 40 moves downward to cause the stripper plate 60 to push the strip metal sheet W against the die plate 22 and, in this state, the upper mold 40 further moves downward, the inner shape punch 45A projects from the punch insertion hole 60A to be inserted in the inner shape punching die hole 26A, and the outer shape punch 45C projects from the punch insertion hole 60C to be inserted in the outer shape punching die hole 26C.

As illustrated in FIG. 3, the adhesive applicator 70 is included in the lower mold body 21 of the lower mold 20. The adhesive applicator 70 is located between the inner shape punching stage 25A and the outer shape punching stage 25C. In this example embodiment, the expression "the adhesive applicator 70 is located between the inner shape punching stage 25A and the outer shape punching stage 25C" includes a case where the adhesive applicator 70 is located in the inner shape punching stage 25A (e.g., the adhesive applicator 70 is located in the first die plate 22A) and a case where the adhesive applicator 70 is located in the outer shape punching stage 25C (e.g., the adhesive applicator 70 is located in the second die plate 22C). In the example illustrated in FIG. 3, a plurality of nozzles 72 of the adhesive applicator 70 are shown. The nozzles 72 are arranged at substantially regular intervals in a double-ring shape. The adhesive applicator 70 is located in the adhesive applying stage 25B (see also FIG. 5). More specifically, the adhesive applicator 70 is located in the adhesive application through hole 27. The adhesive applicator 70 is located below the strip metal sheet W. The adhesive applicator 70 applies an adhesive onto a lower surface WL of the strip metal sheet W. The adhesive applicator 70 applies the adhesive onto the lower surface WL of the strip metal sheet W while the strip metal sheet W is being conveyed from the inner shape punching stage 25A to the outer shape punching stage 25C. The adhesive applicator 70 according to this example embodiment applies the adhesive onto the lower surface WL of the strip metal sheet W by a non-contact application technique (e.g., jet dispensing or splaying). Examples of a liquid adhesive used in the adhesive applicator 70 include an epoxy adhesive, an acrylic adhesive, a silicon adhesive, and a urethane adhesive, and the liquid adhesive is not particularly limited as long as adhesiveness sufficient for obtaining the laminated core 8 is achieved. A method for curing the adhesive is not particularly limited, and examples of the curing method include a solvent evaporation type, a moisture curing type, a heat curing type, and a hardener mixed type.

As illustrated in FIGS. 6A through 6D, the adhesive applicator 70 includes a housing 71, the nozzle 72, a plunger 73, and a supply tube 74. The housing 71 includes an adhesive accommodating chamber 71A that accommodates an adhesive. The housing 71 has an insertion hole 71B in which the supply tube 74 is inserted. The adhesive accommodating chamber 71A communicates with the insertion hole 71B. The nozzle 72 is located in the housing 71. The nozzle 72 communicates with the adhesive accommodating chamber 71A. The nozzle 72 is located below the strip metal sheet W. A discharge port 72A of the nozzle 72 is located below the upper surface 22T of the die plate 22 and the upper surface 23T of the die 23 that are uppermost surfaces of the lower mold 20 (see FIG. 5). The nozzle 72 ejects the adhesive onto the lower surface WL of the strip metal sheet W. The adhesive ejected from the discharge port 72A of the nozzle 72 is applied onto the lower surface WL of the strip metal sheet W in the form of droplets. A portion of the plunger 73 is housed in the adhesive accommodating chamber 71A of the housing. The plunger 73 slides in the adhesive accommodating chamber 71A. The plunger 73 can open and close the insertion hole 71B. The supply tube 74 is inserted in the insertion hole 71B. The supply tube 74 is connected to an adhesive tank (not shown) that accommodates an adhesive. For example, when an application controller 94 of the controller 90 described later (see FIG. 1) drives a supply pump (not shown), for example, the adhesive is thereby supplied to the adhesive accommodating chamber 71A through the supply tube 74.

Figure 6A:
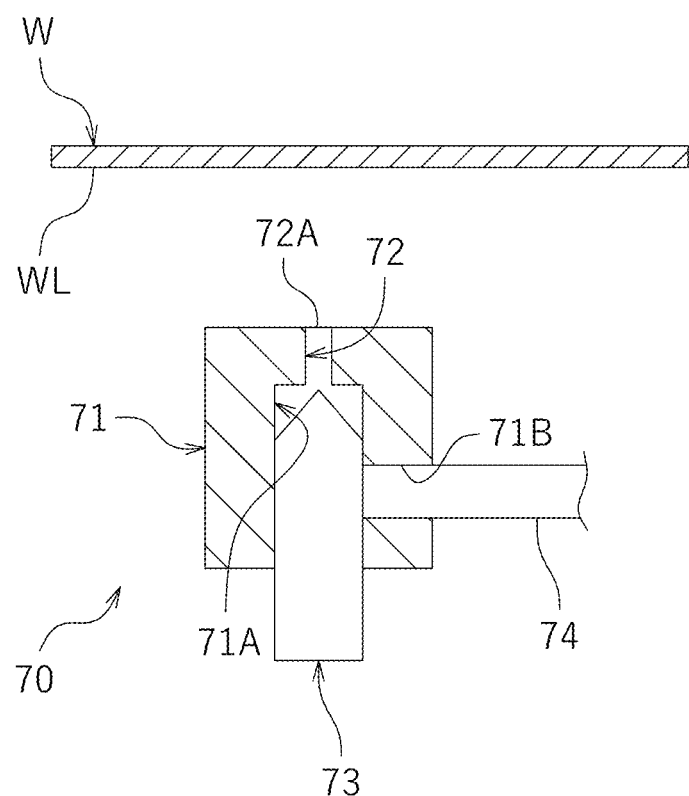
FIG. 6A is a cross-sectional view illustrating a normal state of an adhesive applicator according to one example embodiment of the present invention.
Figure 6B:
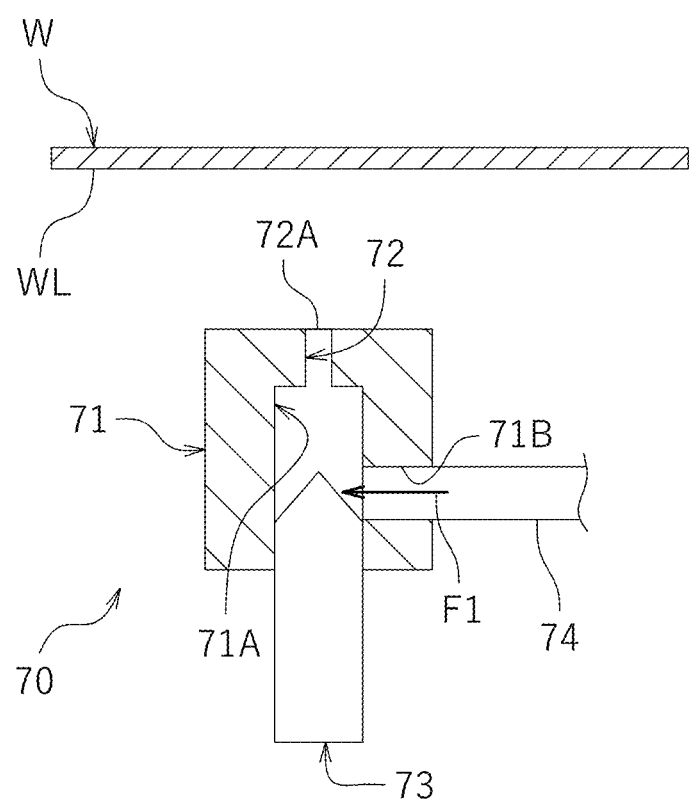
FIG. 6B is a cross-sectional view illustrating a state where an adhesive is supplied to an adhesive accommodating chamber of an adhesive applicator according to one example embodiment of the present invention.
Figure 6C:
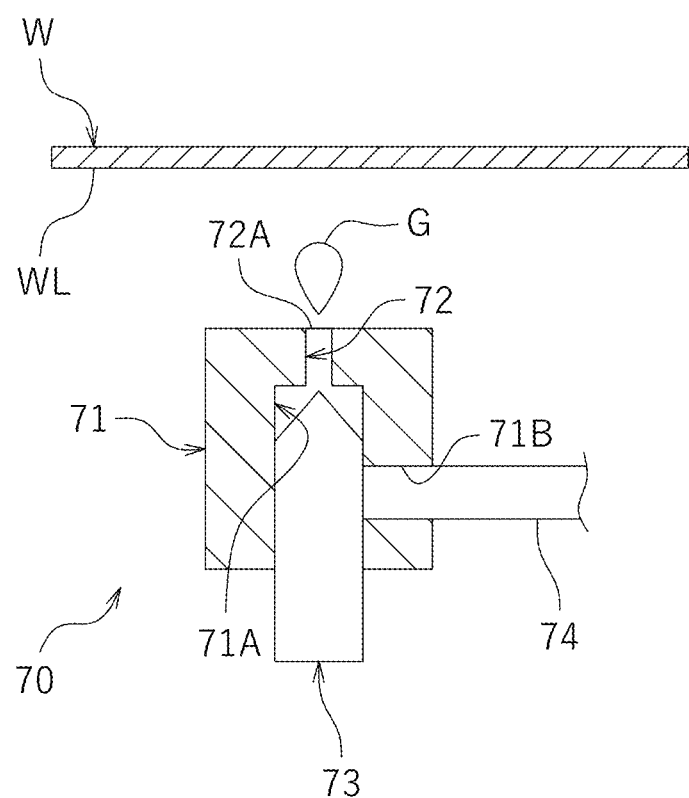
FIG. 6C is a cross-sectional view illustrating a state where an adhesive is discharged from nozzles of an adhesive applicator according to one example embodiment of the present invention.
Figure 6D:
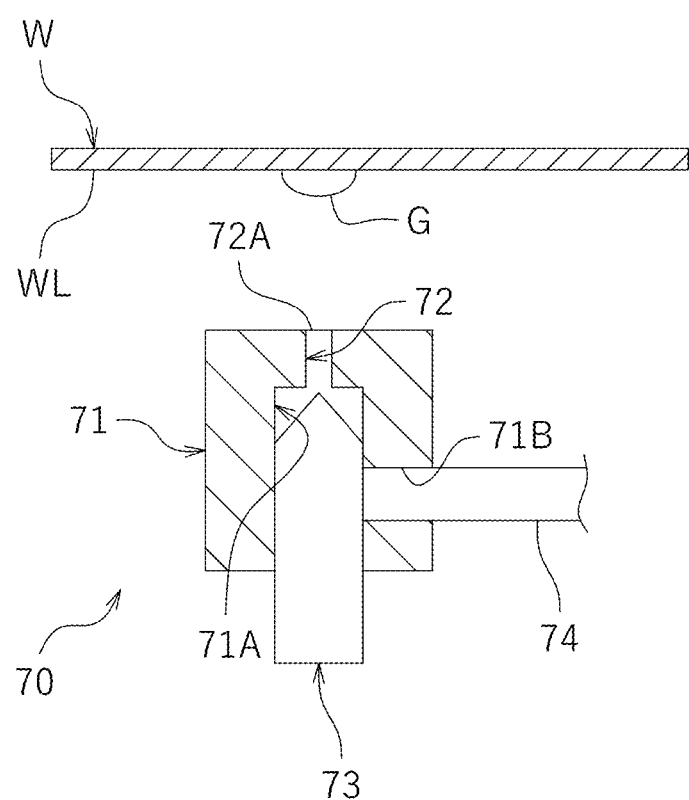
FIG. 6D is a cross-sectional view illustrating a state where an adhesive discharged from nozzles of an adhesive applicator according to one example embodiment of the present invention adheres to a lower surface of a strip metal sheet.

As illustrated in FIG. 6A, while the adhesive applicator 70 does not operate, a major portion of the plunger 73 is housed in the adhesive accommodating chamber 71A. At this time, since the insertion hole 71B is closed by the plunger 73, the adhesive accommodating chamber 71A does not communicate with the insertion hole 71B, and no adhesive is supplied to the adhesive accommodating chamber 71A. As illustrated in FIG. 6B, when a signal is supplied to the adhesive applicator 70, the plunger 73 moves downward, and the insertion hole 71B is opened so that the adhesive accommodating chamber 71A communicates with the insertion hole 71B. Accordingly, as indicated by arrow F1, the adhesive is supplied to the adhesive accommodating chamber 71A through the supply tube 74. As illustrated in FIG. 6C, when filling of the adhesive accommodating chamber 71A with the adhesive is completed, the plunger 73 moves upward. Accordingly, an adhesive G filling the adhesive accommodating chamber 71A is discharged (ejected) from the nozzle 72. At this time, the plunger 73 closes the insertion hole 71B. As illustrated in FIG. 6D, the adhesive G discharged (ejected) from the nozzle 72 is applied onto the lower surface WL of the strip metal sheet W, and the adhesive G adheres to the lower surface WL. When being applied (adhering) to the lower surface WL of the strip metal sheet W, the adhesive G ejected from the discharge port 72A of the nozzle 72 in the form of droplets spreads over a wider range than an opening area of the discharge port 72A.

As illustrated in FIG. 1, the controller 90 is configured or programmed to control the upper mold 40 and the adhesive applicator 70. The controller 90 includes, for example, a central processing unit (CPU) that executes an instruction of a control program, a ROM that stores programs to be executed by the CPU, a RAM that is used as a working area where programs are developed, and a storage device such as a memory that stores the programs and various types of data. The controller 90 is configured or programmed to include a movement controller 92 and the application controller 94. The function of each unit of the controller 90 is implemented by a program. This program is downloaded through the Internet, for example. The program may be read from a recording medium such as a CD or a DVD. The function of each unit of the controller 90 may be implemented by a processor and/or a circuit.

The movement controller 92 is configured or programmed to control upward and downward movements of the stripper plate 60. In this example embodiment, the movement controller 92 is configured or programmed to move the upper mold 40 upward and downward to thereby control upward and downward movements of the stripper plate 60. The movement controller 92 is configured or programmed to control movements of the upper mold 40 toward and away from the lower mold 20.

Figure 7A:
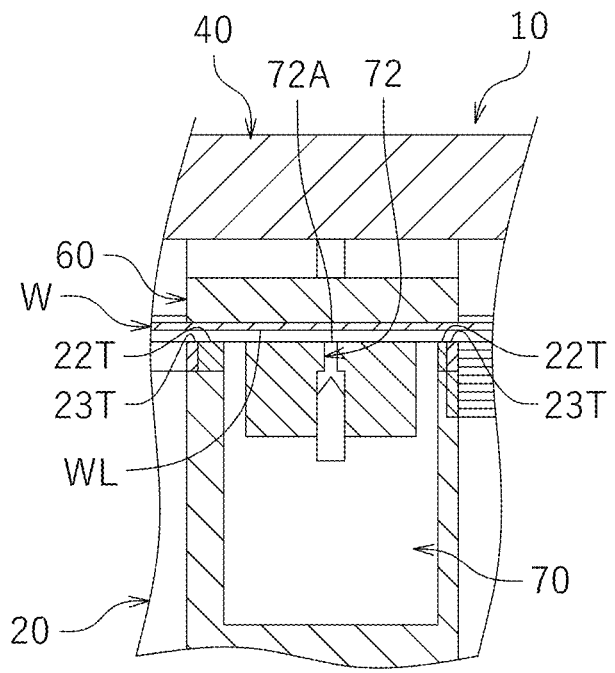
FIG. 7A is a cross-sectional view illustrating a state where a stripper plate according to one example embodiment of the present invention is in contact with a strip metal sheet.
Figure 7B:
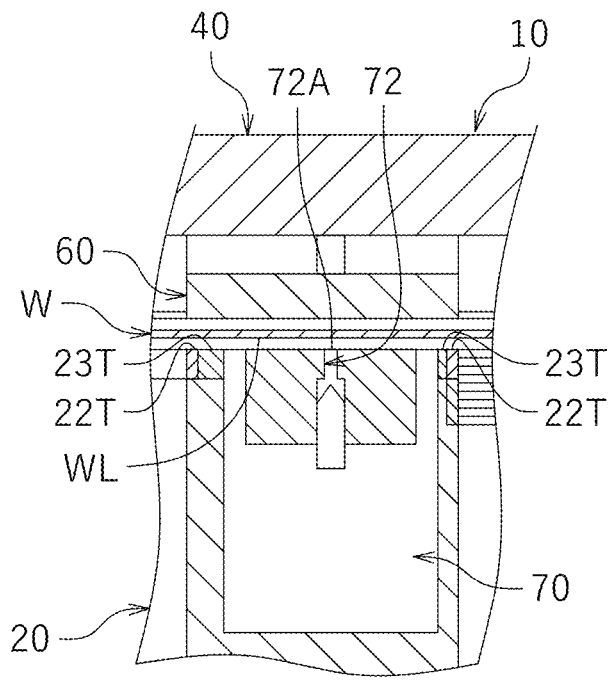
FIG. 7B is a cross-sectional view illustrating a state where a stripper plate according to one example embodiment of the present invention is not in contact with a strip metal sheet.
Figure 7C:
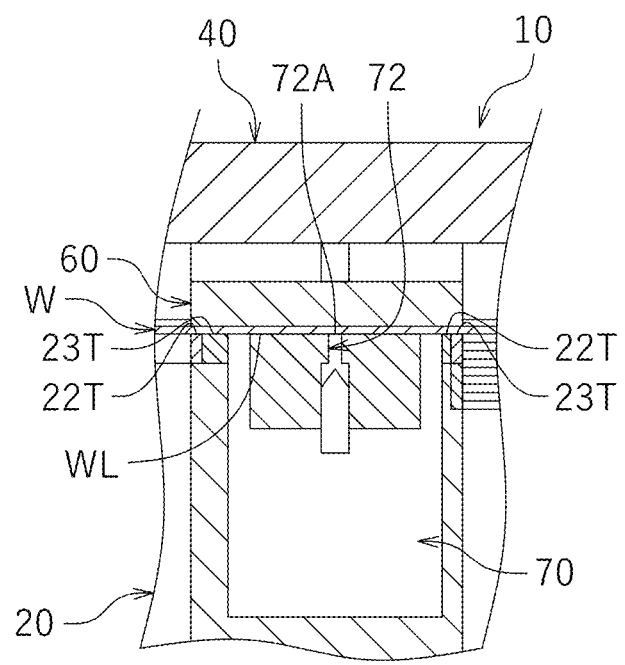
FIG. 7C is a cross-sectional view illustrating a state where a stripper plate according to one example embodiment of the present invention pushes a strip metal sheet against a die plate at a lowest descending position.

The application controller 94 is configured or programmed to control the adhesive applicator 70. The application controller 94 is configured or programmed to control movement of the plunger 73. While the stripper plate 60 is not located at the lowest descending position LP (see FIG. 7C) (more specifically, while the stripper plate 60 does not push the strip metal sheet W against the die plate 22 and the die 23), the application controller 94 is configured or programmed to move the plunger 73 downward to complete filling of the adhesive accommodating chamber 71A with the adhesive. While the stripper plate 60 is not located at the lowest descending position LP (see FIG. 7C), the application controller 94 is configured or programmed to cause the adhesive applicator 70 to apply the adhesive onto the lower surface WL of the strip metal sheet W. While the stripper plate 60 does not push the strip metal sheet W against the lower mold 20 (the die plate 22 and the die 23 in this example), for example, the application controller 94 is configured or programmed to cause the adhesive applicator 70 to apply the adhesive onto the lower surface WL of the strip metal sheet W. The expression "while the stripper plate 60 does not push the strip metal sheet W against the lower mold 20 (i.e., the die plate 22 and the die 23 in this example) herein includes a case where no gap is present between the stripper plate 60 and the strip metal sheet W (i.e., the stripper plate 60 is in contact with the strip metal sheet W) and a gap is present between the strip metal sheet W and the upper surface 22T of the die plate 22 and the upper surface 23T of the die 23 as illustrated in FIG. 7A, and a case where a gap is present between the stripper plate 60 and the strip metal sheet W (i.e., the stripper plate 60 is not in contact with the strip metal sheet W) as illustrated in FIG. 7B. That is, while a gap is at least partially present at least one of between lower mold 20 and the metal sheet W or between the metal sheet W and the stripper plate 60, the application controller 94 is configured or programmed to cause the adhesive applicator 70 to apply the adhesive onto the lower surface WL of the metal sheet W. As illustrated in FIGS. 7A and 7B, while the stripper plate 60 does not push the strip metal sheet W against the lower mold 20 (the die plate 22 and the die 23 in this example), since the lifters 30 cause the strip metal sheet W to move upward, a gap is present between the strip metal sheet W and the lower mold 20 (the upper surface 22T of the die plate 22 and the upper surface 23T of the die 23 in this example). As illustrated in FIG. 7C, in a case where the stripper plate 60 pushes the strip metal sheet W against the die plate 22, no gap is present between the stripper plate 60 and the strip metal sheet W, and no gap is present between the strip metal sheet W and the lower mold 20 (the upper surface 22T of the die plate 22 and the upper surface 23T of the die 23 in this example).

While the stripper plate is not in contact with the strip metal sheet W, the application controller 94 may cause the adhesive applicator 70 to apply the adhesive onto the lower surface WL of the strip metal sheet W. While the stripper plate 60 moves away from the lower mold 20 (i.e., while the stripper plate 60 moves upward), the application controller 94 may cause the adhesive applicator 70 to apply the adhesive onto the lower surface WL of the strip metal sheet W. While the stripper plate 60 moves toward the lower mold 20 (i.e., while the stripper plate 60 moves downward), the application controller 94 may cause the adhesive applicator 70 to apply the adhesive onto the lower surface WL of the strip metal sheet W. While conveyance of the strip metal sheet W is stopped, the application controller 94 may cause the adhesive applicator 70 to apply the adhesive onto the lower surface WL of the strip metal sheet W. While the strip metal sheet W is conveyed (i.e., moves) from the inner shape punching stage 25A to the outer shape punching stage 25C, the application controller 94 may cause the adhesive applicator 70 to apply the adhesive onto the lower surface WL of the strip metal sheet W.

Figure 8:
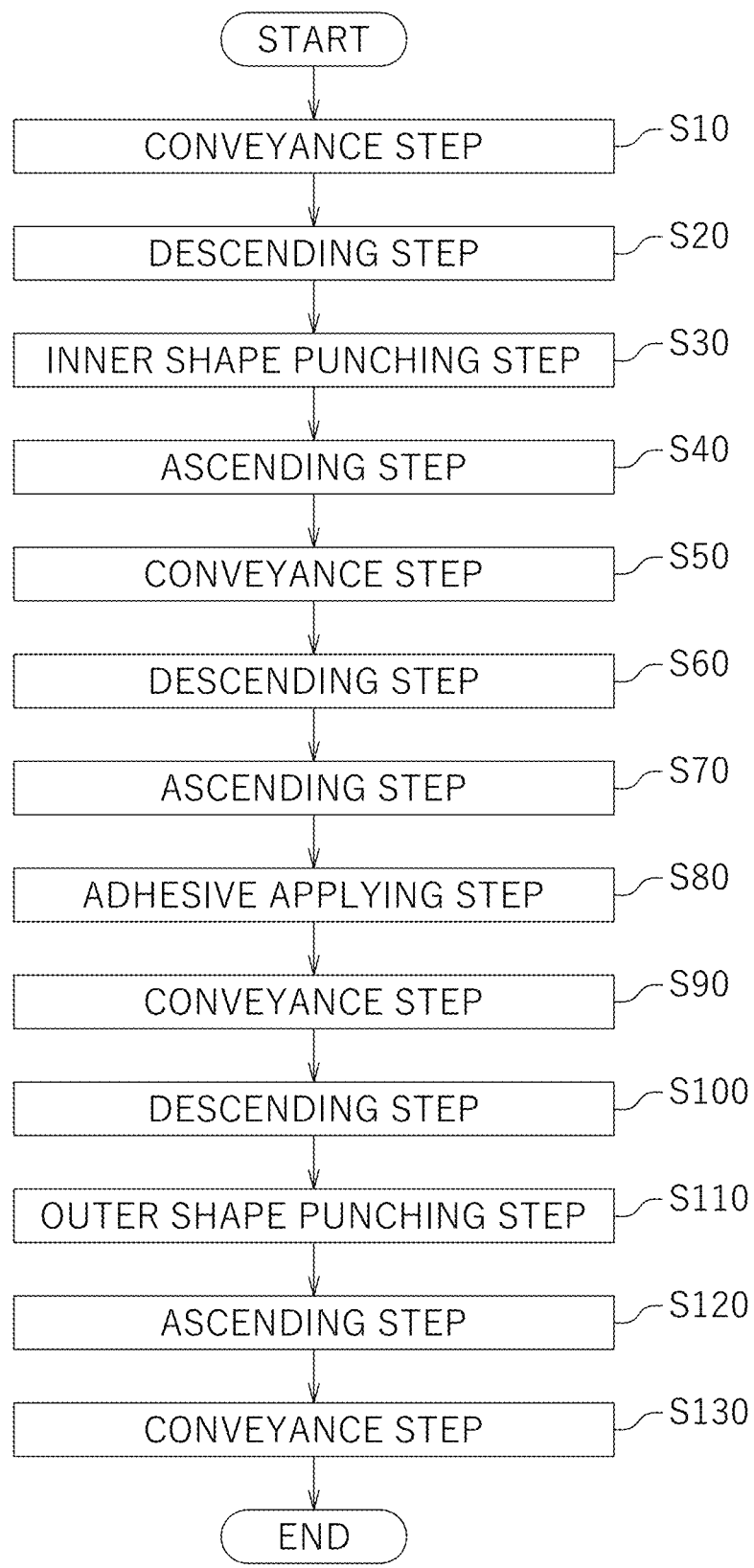
FIG. 8 is a flowchart of a method for fabricating a laminated core according to one example embodiment of the present invention.
Figure 9:
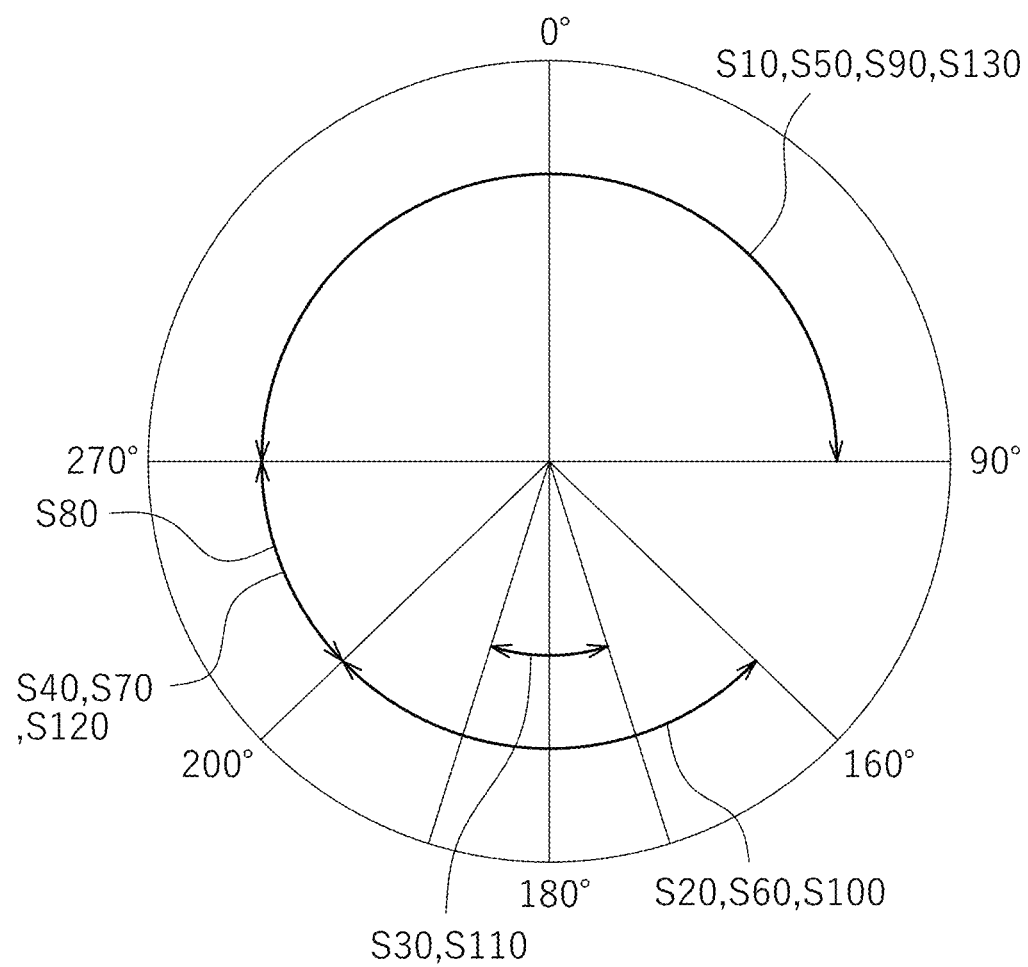
FIG. 9 shows a relationship between the angle of an upper mold of an apparatus for fabricating a laminated core and process steps.

A non-limiting example of a method for fabricating the laminated core 8 will now be described. In this example embodiment, description will be given regarding a method for fabricating the laminated core 8 will while focusing on one of the iron core elements 5 included in the laminated core 8. FIG. 8 is a flowchart depicting the method for fabricating the laminated core 8. As shown in FIG. 8, the method for fabricating the laminated core 8 includes a conveyance step (step S10), a descending step (step S20), an inner shape punching step (step S30), an ascending step (step S40), a conveyance step (step S50), a descending step (step S60), an ascending step (step S70), an adhesive applying step (step S80), a conveyance step (step S90), a descending step (step S100), an outer shape punching step (step S110), an ascending step (step S120), and a conveyance step (step S130). The conveyance step (step S10), the conveyance step (step S50), the conveyance step (step S90), and the conveyance step (step S130) are performed at the same or substantially the same time. The descending step (step S20), the descending step (step S60), and the descending step (step S100) are performed at the same or substantially the same time. The inner shape punching step (step S30) and the outer shape punching step (step S110) are performed at the same or substantially the same time. The ascending step (step S40), the ascending step (step S70), and the ascending step (step S120) are performed at the same or substantially the same time. As shown in FIG. 9, in the method for fabricating the laminated core 8 according to this example embodiment, in one cycle in which the angle (crank angle) of the upper mold 40 passes a top dead point) (0°) and a bottom dead point (180°) and returns to the top dead point (360°) again, the conveyance steps (step S10, step S50, step S90, and step S130), the descending steps (step S20, step S60, and step S100), the inner shape punching step (step S30) and the outer shape punching step (step S110), the ascending steps (step S40, step S70, and step S120), the adhesive applying step (step S80), and the conveyance steps (step S10, step S50, step S90, and step S130) are performed in this order.

In the conveyance step (step S10), the strip metal sheet W is conveyed in a progressive direction D. A portion of the strip metal sheet W moves to a position above the inner shape punching stage 25A.

In the descending step (step S20), when the upper mold 40 moves downward and the stripper plate 60 moves downward, the stripper plate 60 contacts the strip metal sheet W. When the upper mold 40 further moves downward, the stripper plate 60 thereby moves to the lowest descending position LP. At this time, in the inner shape punching stage 25A, the strip metal sheet W is pushed by the stripper plate 60 against the upper surface 22T of the die plate 22 and the upper surface 23T of the die 23. Accordingly, the stripper plate 60, and the die plate 22 and the die 23 sandwich the strip metal sheet W.

In the inner shape punching step (step S30), while the stripper plate 60 is located at the lowest descending position LP, the strip metal sheet W is punched out by the inner shape punch 45A to define an inner shape of the iron core element 5. More specifically, when the upper mold 40 further moves downward, the strip metal sheet W pushed against the upper surface 22T of the die plate 22 and the upper surface 23T of the die 23 are punched out by the inner shape punch 45A and the inner shape punching die hole 26A so that an inner shape of the iron core element 5 is defined in the strip metal sheet W. In the inner shape punching step (step S30), the strip metal sheet W is sandwiched by the stripper plate 60, and the die plate 22 and the die 23. Step S30 is performed in the middle of step S20.

In the ascending step (step S40), when the upper mold 40 moves upward and the stripper plate 60 moves upward, a pressing force of the stripper plate 60 against the strip metal sheet W decreases accordingly. Then, the lifters 30 cause the strip metal sheet W to move away from the upper surface 22T of the die plate 22 and the upper surface 23T of the die 23. When the upper mold 40 further moves upward and the stripper plate 60 further moves upward, the stripper plate 60 is separated from the strip metal sheet W in the inner shape punching stage 25A.

In the conveyance step (step S50), the strip metal sheet W is conveyed in the progressive direction D. A portion of the strip metal sheet W having the inner shape of the iron core element 5 moves to a position above the adhesive applying stage 25B.

In the descending step (step S60), in a manner similar to step S20, in the adhesive applying stage 25B, the strip metal sheet W is pushed by the stripper plate 60 against the upper surface 22T of the die plate 22 and the upper surface 23T of the die 23. Accordingly, the stripper plate 60, and the die plate 22 and the die 23 sandwich the strip metal sheet W.

In the ascending step (step S70), when the upper mold 40 moves upward and the stripper plate 60 moves upward, a pressing force of the stripper plate 60 against the strip metal sheet W decreases accordingly. Then, the lifters 30 cause the strip metal sheet W to be separated from the upper surface 22T of the die plate 22 and the upper surface 23T of the die 23. When the upper mold 40 further moves upward and the stripper plate 60 further moves upward, the stripper plate 60 is separated from the strip metal sheet W in the adhesive applying stage 25B.

In the adhesive applying step (step S80), the adhesive applicator 70 applies (ejects) the adhesive onto the lower surface WL of the strip metal sheet W. More specifically, while the stripper plate 60 is not located at the lowest descending position LP, the adhesive applicator 70 located below the strip metal sheet W applies (ejects) the adhesive onto the lower surface WL of the strip metal sheet W. For example, while the stripper plate 60 is not in contact with the strip metal sheet W, the adhesive applicator 70 located below the strip metal sheet W applies (ejects) the adhesive onto the lower surface WL of the strip metal sheet W. In step S80, the adhesive is applied (ejected) onto a predetermined region of a portion of the lower surface WL of the strip metal sheet W having the inner shape of the iron core element 5. Step S80 may be performed after step S70 or in the middle of step S70. While the stripper plate 60 does not push the strip metal sheet W against the die plate 22 and the die 23, the adhesive applicator 70 may apply (eject) the adhesive onto the lower surface WL of the strip metal sheet W. That is, while a gap is at least partially present at least one of between the lower mold 20 and the metal sheet W or between the metal sheet W and the stripper plate 60, the adhesive applicator 70 may apply (eject) the adhesive onto the lower surface WL of the strip metal sheet W. In the case where step S80 is performed in the middle of step S70, step S80 starts immediately after completion of step S60 in the example shown in FIG. 9, but step S80 may start at an interval after completion of step S60. In step S80, while the stripper plate 60 moves away from the lower mold 20 (i.e., moves upward), the adhesive applicator 70 applies (ejects) the adhesive onto the lower surface WL of the strip metal sheet W. In step S80, while conveyance of the strip metal sheet W is stopped, the adhesive applicator 70 applies (ejects) the adhesive onto the lower surface WL of the strip metal sheet W. In step S80, while the metal sheet W is conveyed, the adhesive applicator 70 may apply (eject) the adhesive onto the lower surface WL of the strip metal sheet W. At this time, a conveyance speed of conveying the metal sheet W may be constant, or the conveyance speed may decrease while the adhesive is applied onto the lower surface WL of the metal sheet W.

In the conveyance step (step S90), the strip metal sheet W is conveyed in the progressive direction D. A predetermined portion of the strip metal sheet W to which the adhesive is applied moves to a position above the outer shape punching stage 25C.

In the descending step (step S100), in a manner similar to step S20, the strip metal sheet W is pushed by the stripper plate 60 against the upper surface 22T of the die plate 22 and the upper surface 23T of the die 23 in the outer shape punching stage 25C. Accordingly, the stripper plate 60, and the die plate 22 and the die 23 sandwich the strip metal sheet W.

In the outer shape punching step (step S110), while the stripper plate 60 is located at the lowest descending position LP, the strip metal sheet W is punched out by the outer shape punch 45C to define an outer shape of the iron core element 5. More specifically, when the upper mold 40 further moves downward, the strip metal sheet W pushed against the upper surface 22T of the die plate 22 and the upper surface 23T of the die 23 is punched out by the outer shape punch 45C and the outer shape punching die hole 26C so that an outer shape of the iron core element 5 is defined in the strip metal sheet W. The resulting iron core element 5 is pushed by the outer shape punch 45C and sequentially stacked in the outer shape punching die hole 26C. Since the lower surfaces of the resulting iron core elements 5 are coated with the adhesive, when the iron core elements 5 are sequentially stacked on the iron core elements 5 already stacked in the outer shape punching die hole 26C, the laminated core 8 including the plurality of iron core elements 5 stacked in the top-bottom direction and bonded to each other is thereby fabricated. In step S110, the strip metal sheet W is sandwiched between the stripper plate 60, and the die plate 22 and the die 23. Step S110 is performed in the middle of step S100.

In the ascending step (step S120), when the upper mold 40 moves upward and the stripper plate 60 moves upward, a pressing force of the stripper plate 60 against the strip metal sheet W thereby decreases. Then, the lifters 30 separate the strip metal sheet W from the upper surface 22T of the die plate 22 and the upper surface 23T of the die 23. When the upper mold 40 further moves upward and the stripper plate 60 further moves upward, the stripper plate 60 is separated from the strip metal sheet W in the outer shape punching stage 25C.

In the conveyance step (step S130), the strip metal sheet W is conveyed in the progressive direction D. A portion of the strip metal sheet W having the outer shape of the iron core element 5 (i.e., remaining material) is conveyed to the outside of the fabrication apparatus 10.

In the manner described above, in the apparatus 10 for fabricating a laminated core according to this example embodiment, while the stripper plate 60 is not located at the lowest descending position LP, the application controller 94 of the controller 90 is configured or programmed to cause the adhesive applicator 70 to apply the adhesive onto the lower surface WL of the strip metal sheet W. In the example described above, in applying the adhesive onto the lower surface WL of the strip metal sheet W from the adhesive applicator 70, since the stripper plate 60 is not located at the lowest descending position LP, the distance between the strip metal sheet W and the adhesive applicator 70 is wide. Thus, the adhesive applied from the adhesive applicator 70 adheres to a wide range of the lower surface WL of the strip metal sheet W. Accordingly, the stacked iron core elements 5 are securely bonded to each other so that the laminated core 8 with high rigidity can be thereby fabricated.

In the apparatus 10 for fabricating a laminated core according to this example embodiment, while the stripper plate 60 does not push the metal sheet W against the lower mold 20, the application controller 94 may cause the adhesive applicator 70 to apply the adhesive onto the lower surface WL of the metal sheet W. In this example, while the adhesive applicator 70 applies the adhesive onto the lower surface WL of the metal sheet W, since the stripper plate 60 does not push the metal sheet W, the distance between the strip metal sheet W and the adhesive applicator 70 is wide. Accordingly, the adhesive can be applied to a wide range of the lower surface WL of the metal sheet W.

In the apparatus 10 for fabricating a laminated core according to this example embodiment, while a gap is at least partially present at least one of between the lower mold 20 and the metal sheet W or between the metal sheet W and the stripper plate 60, the application controller 94 may cause the adhesive applicator 70 to apply the adhesive onto the lower surface WL of the metal sheet W. In this example, in applying the adhesive onto the lower surface WL of the metal sheet W from the adhesive applicator 70, since the gap is present as described above, the distance between the strip metal sheet W and the adhesive applicator 70 is wide. Accordingly, the adhesive can be applied to a wide range of the lower surface WL of the metal sheet W.

In the apparatus 10 for fabricating a laminated core according to this example embodiment, while the stripper plate 60 is not in contact with the strip metal sheet W, the application controller 94 is configured or programmed to cause the adhesive applicator 70 to apply the adhesive onto the lower surface WL of the strip metal sheet W. In this example, in applying the adhesive onto the lower surface WL of the strip metal sheet W from the adhesive applicator 70, since the stripper plate 60 is not in contact with the strip metal sheet W, the distance between the strip metal sheet W and the adhesive applicator 70 further increases. Thus, the adhesive applied from the adhesive applicator 70 adheres to a wider range of the lower surface WL of the strip metal sheet W.

In the apparatus 10 for fabricating a laminated core according to this example embodiment, the application controller 94 is configured or programmed to cause the adhesive applicator 70 to apply the adhesive onto the lower surface WL of the strip metal sheet W while the stripper plate 60 moves away from the lower mold 20. In this example, since the direction of an airflow generated when the stripper plate 60 moves and the direction of application of the adhesive coincide with each other, the adhesive can be more reliably applied onto the lower surface WL of the strip metal sheet W.

In the apparatus 10 for fabricating a laminated core according to this example embodiment, while conveyance of the strip metal sheet W is stopped, the application controller 94 is configured or programmed to cause the adhesive applicator 70 to apply the adhesive onto the lower surface WL of the strip metal sheet W. In this example, the adhesive can be more reliably applied to a predetermined position on the lower surface WL of the strip metal sheet W.

In the apparatus 10 for fabricating a laminated core according to this example embodiment, the adhesive applicator 70 is located between the inner shape punching stage 25A and the outer shape punching stage 25C, and applies the adhesive onto the lower surface WL of the metal sheet W while the metal sheet W is conveyed from the inner shape punching stage 25A to the outer shape punching stage 25C. In this example, since the plurality of nozzles 72 of the adhesive applicator 70 can be arranged in a direction orthogonal to the progressive direction D of the metal sheet W in a plan view, for example, the inner shape punching stage 25A and the outer shape punching stage 25C can be placed in compact space in the progressive direction D. That is, the fabrication time can be shortened.

In the apparatus 10 for fabricating a laminated core according to this example embodiment, the adhesive applicator 70 includes the nozzle 72 that is located below the strip metal sheet W and ejects the adhesive onto the lower surface WL of the strip metal sheet W. In this example, since the nozzles 72 can eject the adhesive, the adhesive can be applied onto a wider range of the lower surface WL of the strip metal sheet W.

In the apparatus 10 for fabricating a laminated core according to this example embodiment, the discharge port 72A of the nozzle 72 is located below the upper surface 22T of the die plate 22 and the upper surface 23T of the die 23 that are uppermost surfaces of the lower mold 20. In this example, since the distance between the discharge port 72A of the nozzle 72 and the lower surface WL of the strip metal sheet W in the top-bottom direction further increases, the adhesive can be applied onto a wider range of the lower surface WL of the strip metal sheet W.

In the method for fabricating a laminated core according to this example embodiment, in the adhesive applying step (step S80), while the stripper plate 60 is not located at the lowest descending position LP, the adhesive applicator 70 applies the adhesive onto the lower surface WL of the strip metal sheet W. In this example, in applying the adhesive onto the lower surface WL of the strip metal sheet W, since the stripper plate 60 is not located at the lowest descending position LP, the distance between the strip metal sheet W and the adhesive applicator 70 is wide. Thus, the adhesive applied from the adhesive applicator 70 adheres to a wide range of the lower surface WL of the strip metal sheet W. Accordingly, the laminated iron core elements 5 are securely bonded to each other so that the laminated core 8 with high rigidity can be thereby fabricated.

In the method for fabricating a laminated core according to this example embodiment, in the adhesive applying step (step S80), while the stripper plate 60 does not push the metal sheet W against the lower mold 20, the adhesive applicator 70 may apply the adhesive onto the lower surface WL of the metal sheet W. In this example, while the adhesive applicator 70 applies the adhesive onto the lower surface WL of the metal sheet W, since the stripper plate 60 does not push the metal sheet W, the distance between the strip metal sheet W and the adhesive applicator 70 is wide. Accordingly, the adhesive can be applied to a wide range of the lower surface WL of the metal sheet W.

In the method for fabricating a laminated core according to this example embodiment, in the adhesive applying step (step S80), while a gap is at least partially present at least one of between the lower mold 20 and the metal sheet W or between the metal sheet W and the stripper plate 60, the adhesive applicator 70 may apply the adhesive onto the lower surface WL of the metal sheet W. In this example, in applying the adhesive onto the lower surface WL of the metal sheet W from the adhesive applicator 70, since the gap is present as described above, the distance between the strip metal sheet W and the adhesive applicator 70 is wide. Accordingly, the adhesive can be applied to a wide range of the lower surface WL of the metal sheet W.

In the method for fabricating a laminated core according to this example embodiment, in the adhesive applying step (step S80), while the stripper plate 60 is not in contact with the strip metal sheet W, the adhesive applicator 70 applies the adhesive onto the lower surface WL of the strip metal sheet W. In this example, in applying the adhesive onto the lower surface WL of the strip metal sheet W, since the stripper plate 60 is not in contact with the strip metal sheet W, the distance between the strip metal sheet W and the adhesive applicator 70 further increases. Thus, the adhesive applied from the adhesive applicator 70 adheres to a wider range of the lower surface WL of the strip metal sheet W.

In the method for fabricating a laminated core according to this example embodiment, in the adhesive applying step (step S80), the adhesive applicator 70 applies the adhesive onto the lower surface WL of the strip metal sheet W while the stripper plate 60 moves away from the lower mold 20. In this example, since the direction of an airflow generated when the stripper plate 60 moves and the direction of application of the adhesive coincide with each other, the adhesive can be more reliably applied onto the lower surface WL of the strip metal sheet W.

In the method for fabricating a laminated core according to this example embodiment, in the adhesive applying step (step S80), while conveyance of the strip metal sheet W is stopped, the adhesive applicator 70 applies the adhesive onto the lower surface WL of the strip metal sheet W. In this example, the adhesive can be more reliably applied to a predetermined position on the lower surface WL of the strip metal sheet W.

In the method for fabricating a laminated core according to this example embodiment, in the adhesive applying step (step S80), the adhesive applicator 70 ejects the adhesive onto the lower surface WL of the strip metal sheet W. In this example, since the adhesive can be ejected, the adhesive can be applied to a wider range of the lower surface WL of the strip metal sheet W.

The foregoing description is directed to the example embodiments of the present disclosure. The example embodiments described above, however, are merely examples, and the present disclosure can be performed in various modes.

In the example embodiments described above, the adhesive applicator 70 applies the adhesive onto the lower surface WL of the strip metal sheet W by the non-contact application technique, but the present disclosure is not limited to this example. The adhesive applicator 70 may bring an adhesive bulging from the nozzles 72 into contact with the strip metal sheet W to transfer the adhesive onto the lower surface WL.

In the example embodiments described above, while the stripper plate 60 does not push the strip metal sheet W against the die plate 22 and the die 23, the application controller 94 moves the plunger 73 downward to fill the adhesive accommodating chamber 71A with the adhesive, but the present disclosure is not limited to this example. While the stripper plate 60 pushes the strip metal sheet W against the die plate 22 and the die 23, the application controller 94 may move the plunger 73 downward to complete filling of the adhesive accommodating chamber 71A with the adhesive. The application controller 94 may cause the plunger 73 to move downward and start filling of the adhesive accommodating chamber 71A with the adhesive while the stripper plate 60 pushes the strip metal sheet W against the die plate 22 and the die 23, whereas the application controller 94 may complete filling of the adhesive accommodating chamber 71A with the adhesive while the stripper plate 60 does not push the strip metal sheet W against the die plate 22 and the die 23.

In the example embodiments described above, the lower mold body 21 of the lower mold 20, the die plate 22, and the die 23 are separate components, but may be integrated as necessary. For example, the die plate 22 and the die 23 may be integrated, or the die plate 22, the die 23, and the lower mold body 21 may be integrated.

In the example embodiments described above, the upper surface 23T of the die 23 and the upper surface 22T of the die plate 22 are located at the same or substantially the same height, but the present disclosure is not limited to this example. For example, the upper surface 23T of the die 23 may be located below the upper surface 22T of the die plate 22. In this case, the stripper plate 60 pushes the strip metal sheet W against the upper surface 22T of the die plate 22.

In the example embodiments described above, the die plate 22 and the die 23 are placed on the lower mold body 21, but the present disclosure is not limited to this example. For example, the die plate 22 and the die 23 may be fitted in a recess that is recessed downward from the upper surface 21T of the lower mold body 21 such that the upper surface 21T of the lower mold body 21, the upper surface 22T of the die plate 22, and the upper surface 23T of the die 23 are located at the same or substantially the same height. In this case, the stripper plate 60 pushes the strip metal sheet W against the upper surface 21T of the lower mold body 21, the upper surface 22T of the die plate 22, and the upper surface 23T of the die 23.

Figure 10:
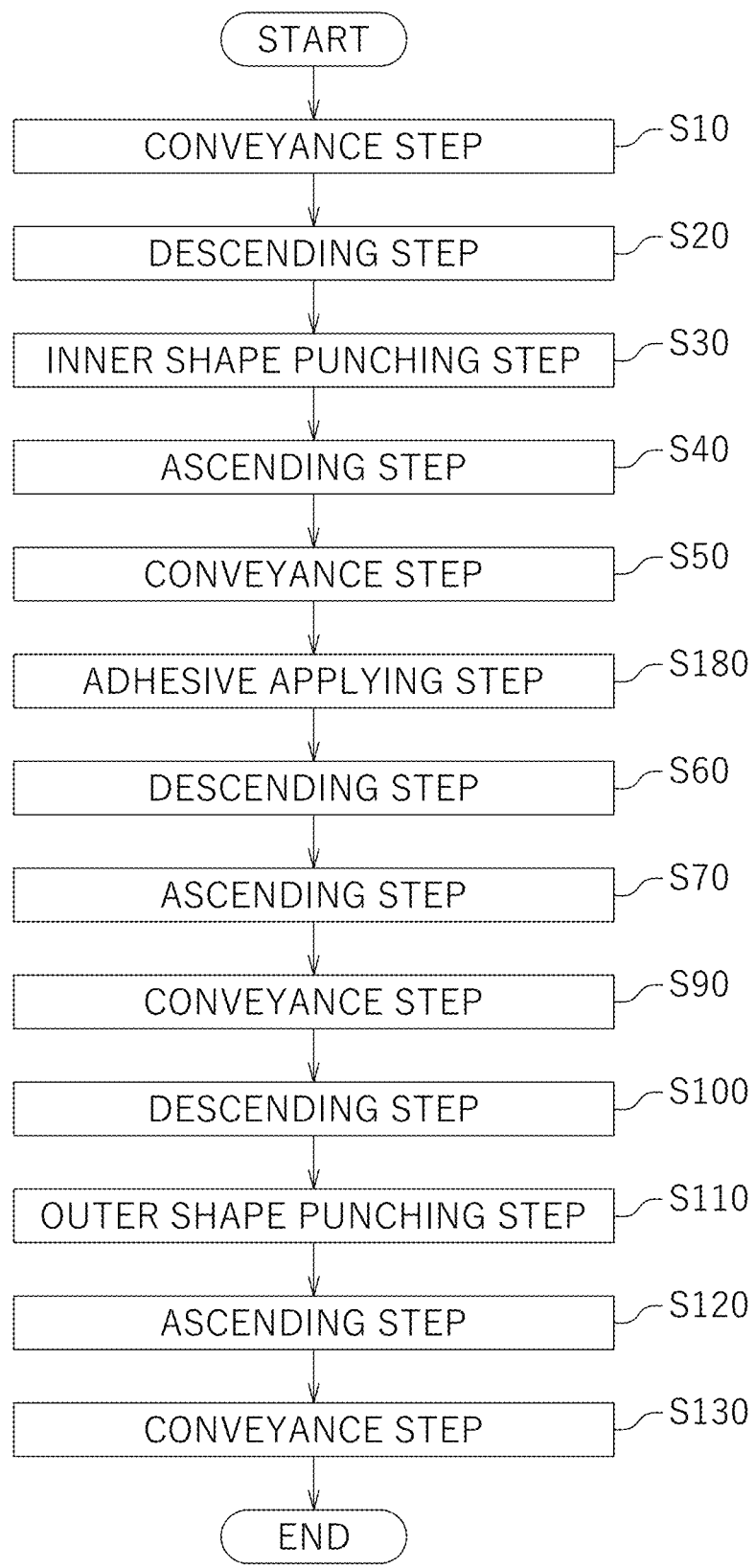
FIG. 10 is a flowchart of a method for producing a laminated core according to a variation.

In the example embodiments described above, in the method for fabricating the laminated core 8, the adhesive applying step (step S80) is performed in the middle of or after the ascending step (step S70), but as shown in FIG. 10, the adhesive applying step (step S180) may be performed in the middle of or before the descending step (step S60). In step S180, the adhesive applicator 70 applies (ejects) the adhesive onto the lower surface WL of the strip metal sheet W. More specifically, while the stripper plate 60 is not in contact with the strip metal sheet W, the adhesive applicator 70 located below the strip metal sheet W applies (ejects) the adhesive onto the lower surface WL of the strip metal sheet W. In step S180, the adhesive is applied (ejected) onto a predetermined region of a portion of the lower surface WL of the strip metal sheet W having the inner shape of the iron core element 5. In step S180, while the stripper plate 60 does not push the strip metal sheet W against the die plate 22 and the die 23, the adhesive applicator 70 may apply (eject) the adhesive onto the lower surface WL of the strip metal sheet W. In step S180, while the stripper plate 60 moves toward the lower mold 20 (i.e., moves downward), the adhesive applicator 70 applies (ejects) the adhesive onto the lower surface WL of the strip metal sheet W. In step S180, while conveyance of the strip metal sheet W is stopped, the adhesive applicator 70 applies (ejects) the adhesive onto the lower surface WL of the strip metal sheet W. In step S180, while the metal sheet W is conveyed, the adhesive applicator 70 may apply (eject) the adhesive onto the lower surface WL of the strip metal sheet W.

In the example embodiments described above, while conveyance of the strip metal sheet W is stopped, the application controller 94 is configured or programmed to cause the adhesive applicator 70 to apply the adhesive onto the lower surface WL of the strip metal sheet W, but the present disclosure is not limited to this example. While the strip metal sheet W is conveyed in the progressive direction D, the application controller 94 may cause the adhesive applicator 70 to apply the adhesive onto the lower surface WL of the strip metal sheet W.

In the example embodiments described above, when the stripper plate 60 moves to the lowest descending position LP, the stripper plate 60 pushes the metal sheet W against the lower mold 20 and sandwich the metal sheet W together with the lower mold 20, but the present disclosure is not limited to this example. For example, when the stripper plate 60 moves to the lowest descending position LP, a gap enough to restrict upward and downward movements of the metal sheet W may be present between the lower surface of the stripper plate 60 and the upper surface of the lower mold 20.

Figure 11:
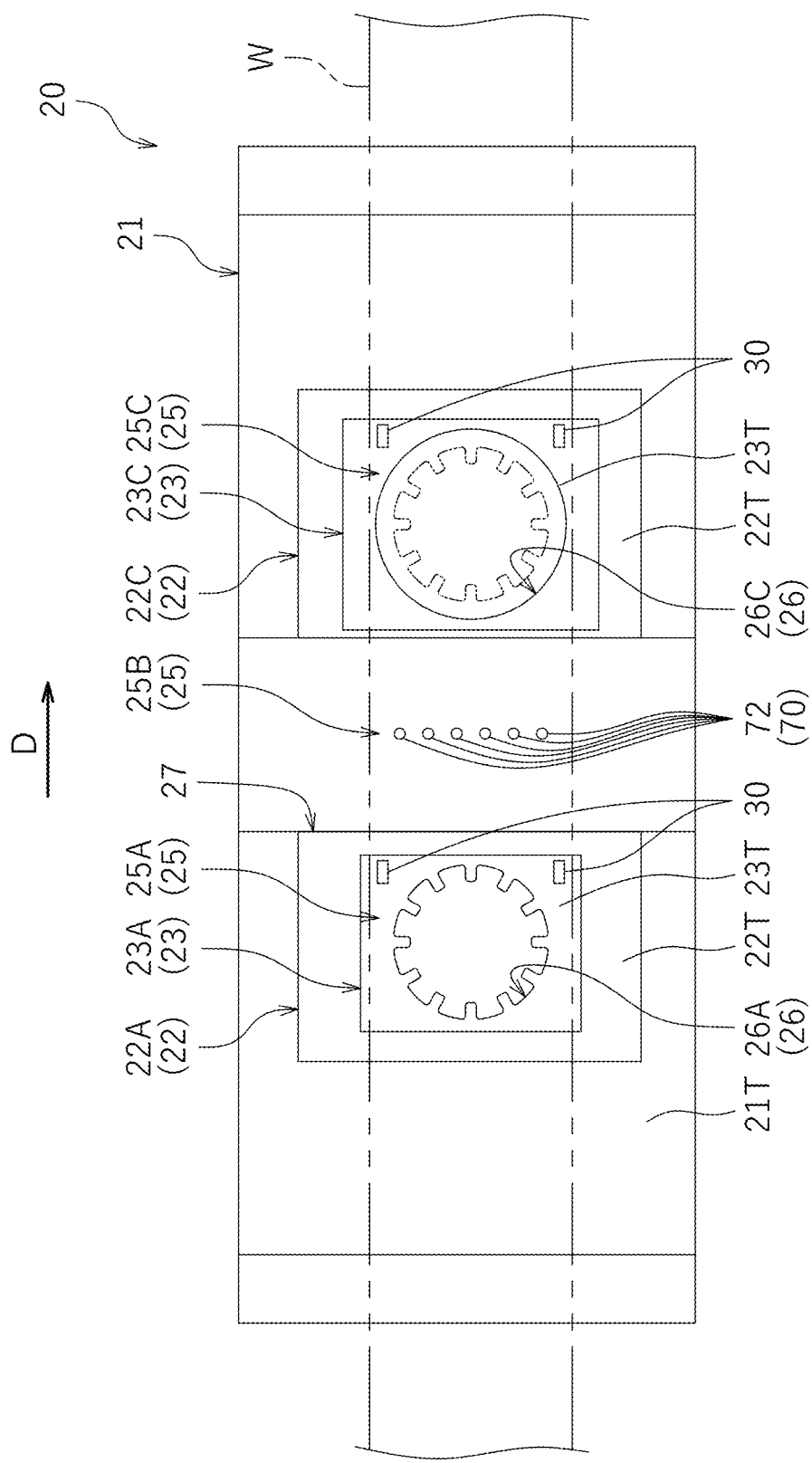
FIG. 11 is a plan view illustrating a lower mold according to a variation.

In the example embodiments described above, the plurality of nozzles 72 of the adhesive applicator 70 are arranged at substantially regular intervals in a double-ring shape, but the present disclosure is not limited to this example. For example, as illustrated in FIG. 11, the plurality of nozzles 72 may be arranged at substantially regular intervals in a direction orthogonal to the progressive direction D in a plan view.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An apparatus for fabricating a laminated core in which a plurality of iron core elements are laminated and bonded to each other, the apparatus comprising:
   a lower mold including a die including a die hole;
   an upper mold including a punch corresponding to the die hole;
   a stripper plate included in the upper mold and movable downward to a lowest descending position that is a lowermost position, the stripper plate being operable to restrict upward and downward movements of a metal sheet during punching out of the metal sheet by the punch;

an adhesive applicator included in the lower mold, located below the metal sheet, and operable to apply an adhesive onto a lower surface of the metal sheet; and a controller configured or programmed to control the stripper plate and the adhesive applicator; wherein the lower mold includes a lifter to push the metal sheet upward and move downward when the metal sheet is pushed downward by the stripper plate; and the controller is configured or programmed to include:
a movement controller configured or programmed to control upward and downward movements of the stripper plate; and
an application controller configured or programmed to cause the adhesive applicator to apply the adhesive onto the lower surface of the metal sheet only while the stripper plate is not located at the lowest descending position.

2. The apparatus according to claim 1, wherein
the stripper plate is operable to push the metal sheet against the lower mold such that the metal sheet is allowed to be sandwiched between the stripper plate and the lower mold when the stripper plate moves to the lowest descending position; and
the application controller is configured or programmed to cause the adhesive applicator to apply the adhesive onto the lower surface of the metal sheet while the stripper plate does not push the metal sheet against the lower mold.

3. An apparatus for fabricating a laminated core in which a plurality of iron core elements are laminated and bonded to each other, the apparatus comprising:
a lower mold including a die including a die hole;
an upper mold including a punch corresponding to the die hole;
a stripper plate included in the upper mold and movable downward to a lowest descending position that is a lowermost position, the stripper plate being operable to restrict upward and downward movements of a metal sheet during punching out of the metal sheet by the punch;
an adhesive applicator included in the lower mold, located below the metal sheet, and operable to apply an adhesive onto a lower surface of the metal sheet; and
a controller configured or programmed to control the stripper plate and the adhesive applicator; wherein
the lower mold includes a lifter to push the metal sheet upward and move downward when the metal sheet is pushed downward by the stripper plate;
the controller is configured or programmed to include:
a movement controller configured or programmed to control upward and downward movements of the stripper plate; and
an application controller configured or programmed to cause the adhesive applicator to apply the adhesive onto the lower surface of the metal sheet while the stripper plate is not located at the lowest descending position; and
the application controller is configured or programmed to cause the adhesive applicator to apply the adhesive onto the lower surface of the metal sheet in a case where a gap is at least partially present at least one of between the lower mold and the metal sheet or between the metal sheet and the stripper plate.

4. An apparatus for fabricating a laminated core in which a plurality of iron core elements are laminated and bonded to each other, the apparatus comprising:
a lower mold including a die including a die hole;
an upper mold including a punch corresponding to the die hole;
a stripper plate included in the upper mold and movable downward to a lowest descending position that is a lowermost position, the stripper plate being operable to restrict upward and downward movements of a metal sheet during punching out of the metal sheet by the punch;
an adhesive applicator included in the lower mold, located below the metal sheet, and operable to apply an adhesive onto a lower surface of the metal sheet; and
a controller configured or programmed to control the stripper plate and the adhesive applicator; wherein
the lower mold includes a lifter to push the metal sheet upward and move downward when the metal sheet is pushed downward by the stripper plate;
the controller is configured or programmed to include:
a movement controller configured or programmed to control upward and downward movements of the stripper plate; and
an application controller configured or programmed to cause the adhesive applicator to apply the adhesive onto the lower surface of the metal sheet while the stripper plate is not located at the lowest descending position; and
the application controller is configured or programmed to cause the adhesive applicator to apply the adhesive onto the lower surface of the metal sheet while the stripper plate is not in contact with the metal sheet.

5. An apparatus for fabricating a laminated core in which a plurality of iron core elements are laminated and bonded to each other, the apparatus comprising:
a lower mold including a die including a die hole;
an upper mold including a punch corresponding to the die hole;
a stripper plate included in the upper mold and movable downward to a lowest descending position that is a lowermost position, the stripper plate being operable to restrict upward and downward movements of a metal sheet during punching out of the metal sheet by the punch;
an adhesive applicator included in the lower mold, located below the metal sheet, and operable to apply an adhesive onto a lower surface of the metal sheet; and
a controller configured or programmed to control the stripper plate and the adhesive applicator; wherein
the lower mold includes a lifter to push the metal sheet upward and move downward when the metal sheet is pushed downward by the stripper plate;
the controller is configured or programmed to include:
a movement controller configured or programmed to control upward and downward movements of the stripper plate; and
an application controller configured or programmed to cause the adhesive applicator to apply the adhesive onto the lower surface of the metal sheet while the stripper plate is not located at the lowest descending position; and
the application controller is configured or programmed to cause the adhesive applicator to apply the adhesive to the lower surface of the metal sheet while the stripper plate moves away from the lower mold.

6. An apparatus for fabricating a laminated core in which a plurality of iron core elements are laminated and bonded to each other, the apparatus comprising:
- a lower mold including a die including a die hole;
- an upper mold including a punch corresponding to the die hole;
- a stripper plate included in the upper mold and movable downward to a lowest descending position that is a lowermost position, the stripper plate being operable to restrict upward and downward movements of a metal sheet during punching out of the metal sheet by the punch;
- an adhesive applicator included in the lower mold, located below the metal sheet, and operable to apply an adhesive onto a lower surface of the metal sheet; and
- a controller configured or programmed to control the stripper plate and the adhesive applicator; wherein
- the lower mold includes a lifter to push the metal sheet upward and move downward when the metal sheet is pushed downward by the stripper plate;
- the controller is configured or programmed to include:
  - a movement controller configured or programmed to control upward and downward movements of the stripper plate; and
  - an application controller configured or programmed to cause the adhesive applicator to apply an adhesive onto the lower surface of the metal sheet while the stripper plate is not located at the lowest descending position; and
- the application controller is configured or programmed to cause the adhesive applicator to apply the adhesive onto the lower surface of the metal sheet only while conveyance of the metal sheet is stopped.

7. The apparatus according to claim 1, wherein the application controller is configured or programmed to cause the adhesive applicator to apply the adhesive onto the lower surface of the metal sheet while the stripper plate moves toward the lower mold.

8. The apparatus according to claim 1, wherein the application controller is configured or programmed to cause the adhesive applicator to apply the adhesive onto the lower surface of the metal sheet while conveyance of the metal sheet is stopped.

9. The apparatus according to claim 1, wherein
the lower mold includes:
- an inner shape punching stage in which the metal sheet is punched out and an inner shape of the iron core element is defined; and
- an outer shape punching stage in which the metal sheet is punched out and an outer shape of the iron core element is defined; and
- the adhesive applicator is located between the inner shape punching stage and the outer shape punching stage, and is operable to apply the adhesive onto the lower surface of the metal sheet while the metal sheet is conveyed from the inner shape punching stage to the outer shape punching stage.

10. The apparatus according to claim 1, wherein the adhesive applicator includes a nozzle from which the adhesive is ejected onto the lower surface of the metal sheet.

11. The apparatus according to claim 10, wherein the nozzle includes a discharge port located below an uppermost surface of the lower mold.

* * * * *